C. F. PIKE.
TRAP FOR CATCHING PORPOISES.
APPLICATION FILED SEPT. 11, 1909.
972,231.
Patented Oct. 11, 1910.
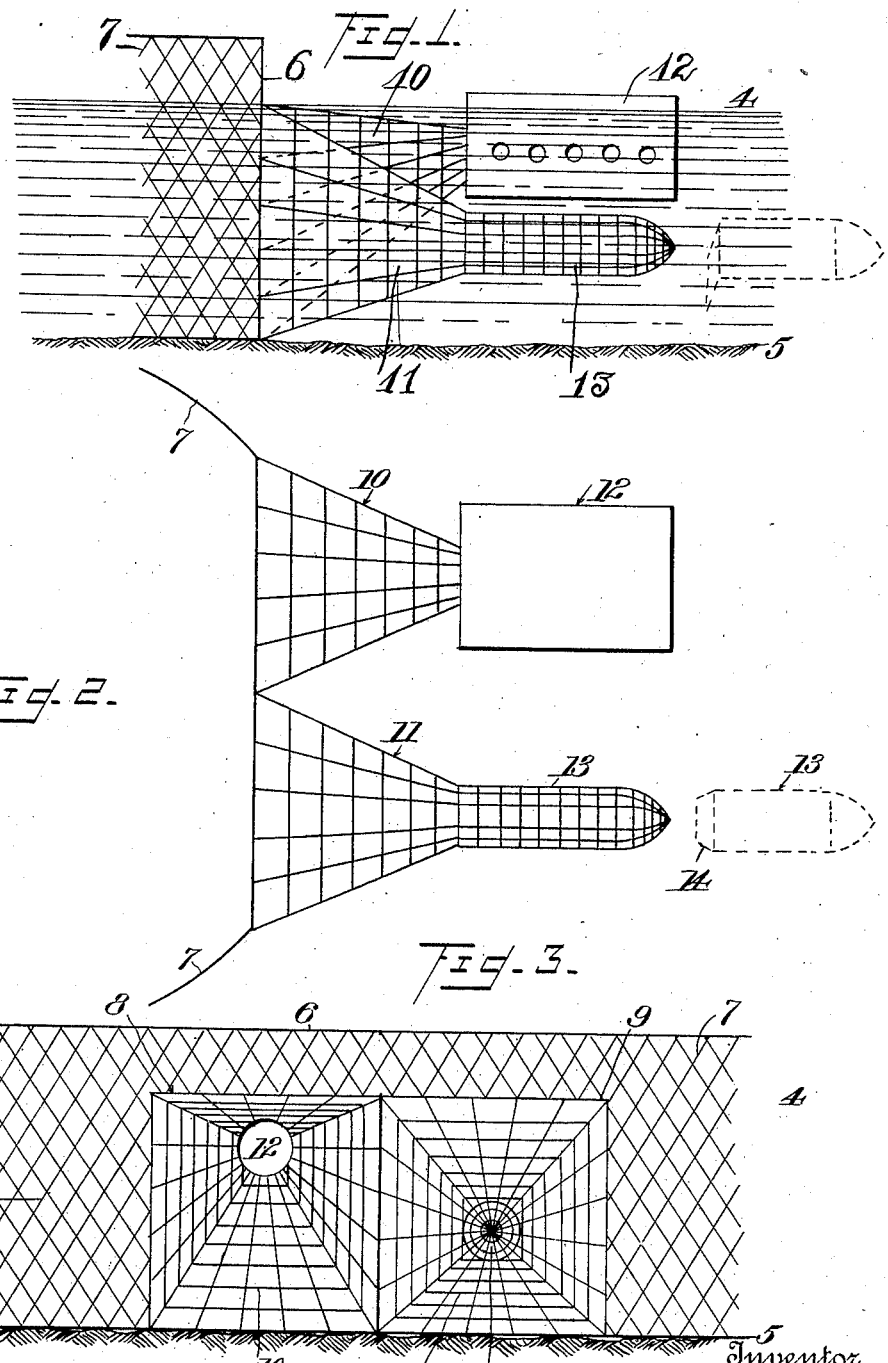

UNITED STATES PATENT OFFICE.

CHARLES F. PIKE, OF PHILADELPHIA, PENNSYLVANIA.

TRAP FOR CATCHING PORPOISES.

972,231.  Specification of Letters Patent.  Patented Oct. 11, 1910.

Application filed September 11, 1909. Serial No. 517,251.

*To all whom it may concern:*

Be it known that I, CHARLES F. PIKE, a citizen of the United States, residing at Philadelphia, in the county of Philadelphia and State of Pennsylvania, have invented certain new and useful Improvements in Traps for Catching Porpoises, (Case H,) of which the following is a specification.

My invention relates to devices for catching fish and especially for catching the porpoise.

In this art as heretofore developed means have been provided for this purpose which comprise in general terms obstructions, such as nets or seines, placed in the path traveled by the porpoise, and in the rear thereof receptacles with forward openings coinciding with openings in the obstructions, whereby the porpoise upon encountering the obstruction will pass through the opening therein into the receptacle in the rear thereof.

The porpoise generally swim near the surface of the water and while they will to some extent pass through the opening in the obstruction placed in their path, they will be very liable, when they meet an obstruction, to jump over it and thus be lost to the fisher. After passing into a receptacle, whether detachable or fixed to the obstruction, there is a liability that the porpoise if held below the surface of the water, will smother and thus render its carcass almost worthless, the quality of the hide even being deteriorated.

The object of the present invention is to provide means for catching the porpoise by providing an obstruction which extends above the surface of the water to such an extent that it will cause the porpoise to dive under instead of jumping over, and means for catching the porpoise when he does dive under, the construction, arrangement and operation of the parts of such improved means being hereinafter fully described and afterward specifically claimed.

In the accompanying drawing I have illustrated an embodiment of my invention, in which—

Figure 1 is a side elevation. Fig. 2, a top plan view, and Fig. 3, a front elevation.

Referring specifically to the drawing, 4 indicates the surface and 5 the bottom of a body of water in which the apparatus is to be operated.

An obstruction, in this instance shown as an ordinary seine or net, as at 6, is placed in position in the path of the porpoise and secured therein by any suitable means. The obstruction may be straight, or may be curved as at 7 in Fig. 2, and is provided with an opening or openings, as at 8 and 9, which extend from the surface of the water to the bottom thereof. From each opening there extends rearwardly a conical guide preferably of netting, as at 10 and 11. Attached to the conical guide 10 is a receiver 12 in the form of a floating live box having suitable openings in its sides to permit the free flow of the water into and out of the body thereof and having its top open so that a porpoise contained therein may have access to the air. Attached to the conical guide 11 I have shown a receiver 13 of an ordinary construction, being formed of any suitable netting and in any well known manner, as the same has been heretofore formed. In devices of this class as heretofore constructed, receivers of the form of the receiver 13 have been so constructed that when the porpoise enters the same through the conical guide, the receiver will be detached and with a porpoise therein will be moved away from the obstruction and guide. When so detached the rear end has been constructed so as to drop down and close the rear opening. In the use of these devices it has been found that the detached net with the porpoise therein, is often lost, or when found the fish, tangled up and impeded in the meshes of the receiver and unable to reach the surface of the water, has been smothered. To avoid this I construct my receiver, as hereinbefore described, in the form of a floating live box 12. When the porpoise passes through the conical guide 10 into this floating live box 12, the live box, which is only of a size to accommodate a single porpoise, is detached from the conical guide and floats away therefrom.

The top of the live box projecting above the surface of the water may be readily seen so that the danger of the porpoise escaping is obviated, and the fish being afforded ready access to the surface of the water is not in any danger of smothering or drowning even though it might be a considerable length of time before the box is found and emptied.

I do not desire to be limited to the exact constructions of the several parts shown so long as the object of the invention is carried out. For instance, the openings are shown as extending from the top to the bottom of the water. This may be varied, obviously and the form of the receivers may be varied as I make no claim to their specific construction.

Having described my invention, what I claim as new and desire to secure by Letters Patent, is—

A device of the character described, comprising an obstruction adapted to be placed in the water in the path of travel of the porpoise, extending above and below the surface of the water and provided below the surface with an opening, in combination with a tubular guide leading rearwardly from said opening, and a receiver in the rear of and detachably connected to the outer end of said guide, said receiver being in the form of a floating live box having openings to afford free flow of water therethrough and projecting above the surface of the water to afford a contained porpoise free access to the air.

In testimony whereof I affix my signature in presence of two witnesses.

CHARLES F. PIKE.

Witnesses:
Wm. A. Pike,
John Devlin.